April 3, 1951 W. A. PRIEBE 2,547,489
BUTT GAUGE
Filed May 19, 1947 2 Sheets-Sheet 1
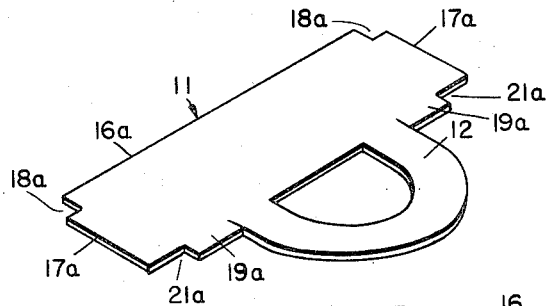
FIG. 1.
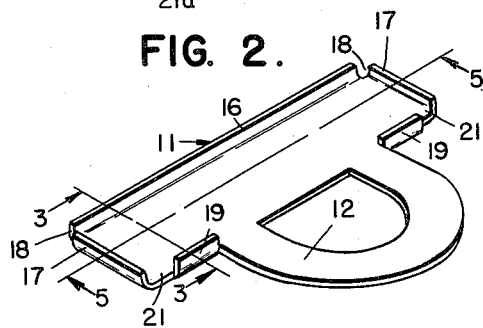
FIG. 2.
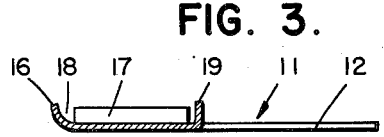
FIG. 3.
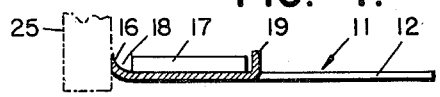
FIG. 4.
FIG. 5.
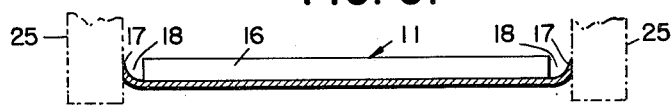
FIG. 6.
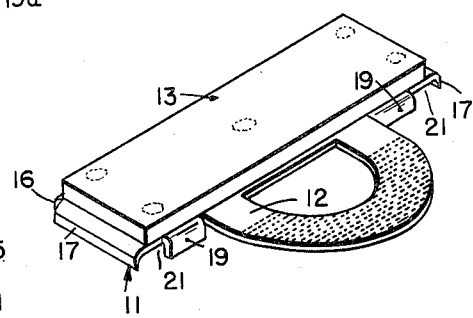
FIG. 7.
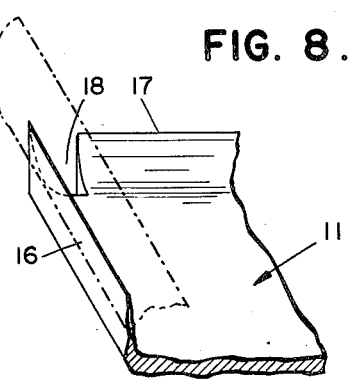
FIG. 8.
INVENTOR
WILLIAM A. PRIEBE
BY 
ATTORNEY April 3, 1951  W. A. PRIEBE  2,547,489
BUTT GAUGE Filed May 19, 1947  2 Sheets-Sheet 2

INVENTOR
WILLIAM A. PRIEBE
BY
ATTORNEY

Patented Apr. 3, 1951

2,547,489

UNITED STATES PATENT OFFICE 2,547,489

BUTT GAUGE

William A. Priebe, Los Angeles, Calif.

Application May 19, 1947, Serial No. 748,952

5 Claims. (Cl. 33—197)

The present invention relates to butt gages in general and particularly to a simple and economically constructed butt gage which may be used by carpenters and by novices with consistently satisfactory results. More specifically the invention comprises a butt gage simply constructed and eliminating all relatively movable parts, each gage being designed for use in the mounting of a hinge of one size.

Butt gages have long been used for the accurate mounting of hinges of doors and other pivoted members. If a door is to swing freely and easily it is essential that the hinge be properly seated and, if there are a plurality of hinges, that they be accurately aligned. The proper use of a good butt gage aids in securing those results. In many instances it is found that the leaf of the hinge is substantially as wide as the door is thick. In such cases frequently the narrow strip of wood extending between the edge of the hinge and the adjacent door face is broken or split because the butt gage has not been accurately adjusted or, if of the usual adjustable type, not sufficiently tightened.

While butt gages are not particularly complicated yet experience teaches that in the hands of the novice carpenter or amateur the results accruing from the use of an adjustable gage are usually not good.

With an appreciation of the defects of the structures of the prior art and the disadvantages which accrued from their characteristics, and in order to overcome those defects and disadvantages, it is a purpose of the present invention to provide a new and improved butt gage.

It is another object of the invention to provide a simplified butt gage eliminating all relatively movable parts and in which a gage initially aligned is drawn into absolutely proper alignment during the seating operation.

A further object of the invention is to provide a butt gage in which the cutting edges are laterally spaced from the holding element and the force-receiving surface is positioned immediately thereover.

A still further object of the invention is to provide a butt gage in which an initial starting tap upon the gage draws the gage into proper alignment with the edge of the door.

A still further object of the invention is to provide a butt gage in which the adjacent end of angularly related cutting edges are spaced to permit of the sharpening of the cutting edges by the reciprocation of a thin file.

A still further object of the invention is to provide a new and novel method for manufacturing a butt gage.

These and other more specific objects will appear upon reading the following specification and claims and upon considering in connection therewith the attached drawings to which they relate.

Referring now to the drawings in which a preferred embodiment of the invention is illustrated:

Figure 1 is a view in perspective of a metallic stamping from which the cutting elements and the supporting handle are formed.

Figure 2 shows the blank of Figure 1 following the second step in the manufacturing operation, the edges being rolled over to provide cutting blades and retaining lugs;

Figure 3 is a transverse section upon the line 3—3 of Figure 2;

Figure 4 illustrates the grinding operation by which the curved front lip is sharpened into a cutting edge;

Figure 5 is a longitudinal section upon the line 5—5 of Figure 2;

Figure 6 illustrates the grinding operation by which the curved side edges are sharpened into cutting edges;

Figure 7 is a showing of the final step in the assembly operation in which the force-receiving anvil is positioned upon the back of the gage body and secured in place;

Figure 8 illustrates the manner in which the front end cutting edge or blades may be sharpened by the user with a thin auger file;

Figure 9:
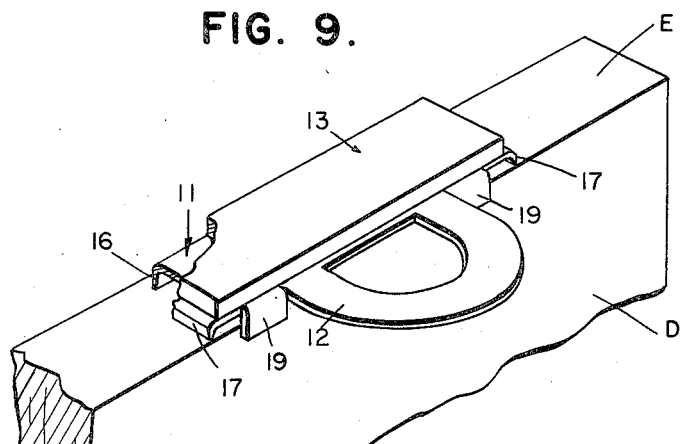
Figure 9 shows the positioning of the gage upon the door edge at the beginning of the seat-forming operation.

Referring again to the drawings, a butt gage constructed in accordance with the present invention is illustrated in Figure 7 and is seen to comprise a main body, indicated generally by the reference character 11, from which extends a handle 12, and to the upper surface of which is secured, as by welding, a flat anvil 13. The handle preferably comprises an integral semi-circular ring which, as illustrated, is roughened on its flat surfaces to provide a more secure grip. The anvil 13 is a relatively heavy plate, its primary function being to receive a driving force from a hammer or mallet. In size it is somewhat less in all dimensions, save its thickness, than the body 11.

The underside of body 11 is formed with a downwardly extending continuous front cutting edge or lip 16 and with side cutting lips or edges 17, open notches 18 being present at their intersections.

The rearward edge of plate 11 is formed with downwardly-extending lugs 19 adjacent the outer sides of the handle 12, each lug ending short of the adjacent side cutting lip or edge 17, as is clearly illustrated in Figure 2. Open notches 21 are thus present between the outer ends of lugs 19 and the adjacent ends of blades 17.

An additional feature of importance, illustrated possibly with greatest clarity in Figures 3 to 8, comprises the fact that the forward lip 16 is of greater heighth than side edges or lips 17 which have a common cutting plane, the rearward lugs 19 extending from the plate 11 to about the same distance as the front lips 17.

The steps in the process of manufacturing butt gages in accordance with the present invention are illustrated in Figures 1 to 7, inclusive. Initially a blank is stamped from a sheet of metal into the form illustrated in Figure 1. The construction is flat, lying in a single plane in this first step, and the edges from which the front and side cutting blades 16 and 17 are to be formed are indicated by the reference characters 16a and 17a. Notches 18 and 21 are represented in this initial stage by the reference characters 18a and 21a and their size and general configuration will change in the following step.

Following the stamping operation the blank is placed in a brake and the edges 16a, 17a and 19a are rolled or pressed over into the configurations illustrated clearly in Figure 2. It is to be noted that, as is evidenced clearly in Figures 3 and 5 in particular, the lips or blades 16 and 17 are curved, while the lugs 19 are flat and extend perpendicularly to the main body of plate 11. It is particularly to be noted that the extremity of lip 16, as well as lugs 19, extend beyond lip or blade 17, this distance being about one-sixteenth inch in preferred embodiment.

The next step in the operation comprises the sharpening of blades 16 and 17 and this is accomplished by firmly mounting body 11 and then moving the flat surface of the grinding wheel longitudinally past the edge, in the manner illustrated in dotted line for lip 16 in Figure 4 and for the side lips 17 in Figure 6. The inner surface of each of these lips already curves outwardly and the perpendicular facing of the outer surfaces effects the formation of acute cutting edges, as is clearly illustrated in Figures 4 and 6. In this operation is is possible to stack a plurality of the plates 11 and to sharpen simultaneously all the lips 16 in the stack and, by the use of a pair of grinding wheels 25 upon the opposite sides of the stack, to sharpen simultaneously the side lips 17.

Anvils 13 are then welded to the individual bodies 11 in the final step and the resultant construction is that illustrated in Figure 7.

Figure 10:
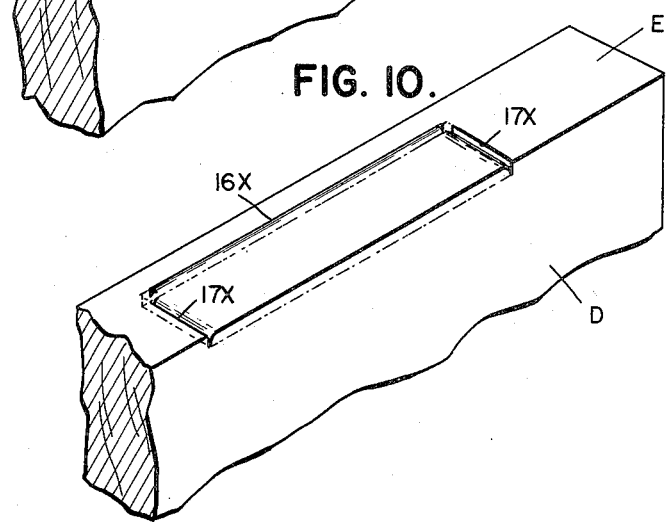
Figure 10 shows the cuts made in the door edge by the use of a butt gage constructed in accordance with the present invention.

Referring now to Figure 9 in particular, the use of the butt gage constructed in accordance with the present invention is clearly illustrated. It having been determined that the hinge should be seated at a particular point along the edge E of the door D, the user holds the gage by its handle 12 with the downwardly extending lugs 19 pressed against the side of the door as illustrated. The lugs 19 are parallel and, the side of the door being flat, the cutting edge 16 will lie parallel thereto and at a fixed distance therefrom. As the blade 16 extends below the side blades 17 the unit will rest upon the former and upon the corners of the blades 17, the lugs 19 insuring proper alignment. If then a slight tap is given to the top of anvil 13 the lip 16 is driven into and penetrates the door edge E along the line 16x, illustrated in Figure 10. The operator then sizes up the situation to determine that the cut is being made in the exact position desired. If in the event a slight shifting is necessary a light end thrust tap is given at the proper end to effect the desired result, the shift being effected without encountering opposition from the blades 17, which, being of shorter length than the blade 16, readily permit the aligning movement. It may be noted that the inner sloped curvature of edge 16 has drawn lugs 19 tightly against the side of door D. The operator then, and with repeated blows, forces the gage downwardly into the door edge to make the defining cuts 16x and 17x shown in Figure 10. The completed seat for the hinge leaf is then formed by removing the wood from within the limits defined by the cuts 16x and 17x, as with a chisel and in a manner well known to all carpenters. In the operation, regardless of how close the cut 16x may be to the adjacent side of the door there is no danger of the wood strip breaking for, as was previously pointed out, the outer face of the lip 16 is perpendicular, while the inner face thereof is curved. Consequently the side of cut 16x nearest the adjacent door side is parallel thereto, the fact that the lugs 19 have been drawn closely against the opposite side of the door preventing movement which could result in the breaking of the narrow strip of wood.

After extended use it may be desirable to sharpen the cutting edges 16 and 17 and this is readily accomplished by virtue of the presence of the end notches 18 and 21. By the use of an auger file, a file which is relatively flat and thin, the interior surfaces of each of the cutting edges may be filed in the manner illustrated in Figure 8. The file is able to pass through the notches 18 and to be reciprocated therein while in contact with the inner surface of the edge 16. The outer flat surface may be sharpened in an obvious manner. Similarly the file may be reciprocated upon the interior surfaces of the lips 17 by extending through notches 18 and 21. In the absence of the notches it would be difficult to file the interior faces of these edges.

Figure 11:
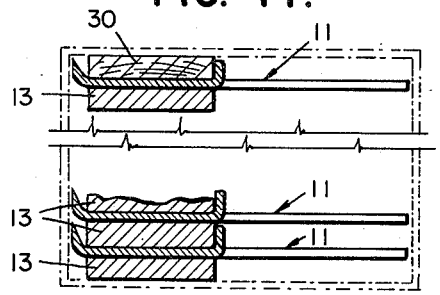
Figure 11 illustrates the manner in which butt gages, constructed in accordance with the present invention, may be stacked for shipment in a minimum of space.

Referring now specifically to Figure 11, the manner in which these gages may be stacked in compact relationship for shipping purposes is clearly illustrated. The anvils 13 have a thickness which is slightly greater than the extension of the cutting edges 16 and 17 from the normal plane of body 11 and its dimensions are such that it is adapted to fit inside the cutting blades of an adjacent similar gage, as illustrated. Accordingly, a plurality of gages may be stacked in interfitting relationship as illustrated without injury to the cutting edges. When so positioned and tied the gages are in effect locked together and, if desired, a supplemental block of wood, similar in size and shape to an anvil and indicated by the reference character 30, may be fitted in the uppermost gage to prevent contact of its cutting edges with adjacent surfaces.

While the particular embodiment of the invention herein shown and described in detail is fully capable of attaining the objects and providing the advantages hereinbefore stated, it is to be understood that it is merely illustrative of the presently preferred form of the invention and it is not intended to limit the disclosure to the details of this construction or design hereinbefore shown, other than as defined in the appended claims.

I claim:

1. A butt gage comprising a flat rectangular plate having a face and a back and having upon three sides of its face a middle edge and a side edge extended normal to said face, said middle edge extending farthest from said face and being spaced at its ends from the planes of said side edges, said side edges being spaced at their ends from the plane of said middle edge, the spacing of said ends providing openings to receive a sharpening file, a flat handle positioned opposite said middle side and extended parallel to said face, lugs extended from the fourth side of said face in the same direction as said edges and adapted to abut the side of a door and cooperate with said middle edge in positioning said gage relative thereto, and an anvil on the back of said plate to receive blows to drive said middle and side edges into a contacted surface.

2. A butt gage comprising a flat rectangular plate having a face and a back and having upon three sides of its face a middle edge and a side edge extended therefrom, the outside of each side edge extending perpendicular to said face, the junction of said middle edge and said face being concave, said middle edge extending farthest from said face and being spaced at its ends from the planes of said side edges, said side edges being spaced at their ends from the plane of said middle edge, the spacings of said ends providing openings to receive a sharpening file, a flat handle positioned opposite said middle side and extended parallel to said face, a lug extended from th fourth side of said face in the same direction as said edges and adapted to abut the side of a door and to be drawn thereagainst by said middle edge as it advances into the underlying door surface, and an anvil on the back of said plate to receive blows to drive said middle and side edges into said door surface.

3. A butt gage comprising a flat rectangular plate having a face and a back and having upon three sides of its face a middle and side edges extended therefrom, the outside of each side edge extending perpendicular to said face, the junction of said middle edge and said face being concave, said middle edge extending farthest from said face and being spaced at its ends from the planes of said side edges, said side edges being spaced at their ends from the plane of said middle edge, the spacings of said ends providing openings to receive a sharpening file, a flat handle positioned opposite said middle side and extended parallel to said face, a pair of spaced lugs integral with said plate and extended from the fourth side of said face in the same direction as said edges and adapted to abut the side of a door and to be drawn thereagainst by said middle edge as it advances into the underlying door surface, and an anvil on the back of said plate to receive blows to drive said middle and side edges into said door surface.

4. In a butt gage, a rigid body having a forward edge, a rear edge, and ends extending between and angularly relative to said edges, a front cutting edge extending downwardly from said body along said forward edge, side cutting edges extending downwardly from said body along the ends of said body beyond the extremities of said front cutting edge, said side cutting edges ending short of imaginary extensions of said front cutting edge, the space between the adjacent ends of said front cutting edge and said side cutting edges providing notches to receive a sharpening file in selective contact with said cutting edges, and a handle extending rigidly from the rear edge of said body.

5. In a butt gage, a rigid body having a forward edge, a rear edge, and ends extending between and angularly relative to said edges, a front cutting edge extending downwardly from said body along said forward edge, side cutting edges extending downwardly from said body along the ends of said body, the cutting extremities of said side cutting edges lying in the same plane and spaced at a lesser distance from said body than the cutting extremities of said front cutting edge, a lug rigid with said body and extended downwardly therefrom at said rear edge, characterized in that with said body resting upon the edge of a door with said lug extended along the side thereof a limited downward force exerted on said body will produce an initial cut by said front cutting edge.

WILLIAM A. PRIEBE.

REFERENCES CITED

The following references are of record in the file of this patent:

UNITED STATES PATENTS

| Number | Name | Date |
|---|---|---|
| 537,870 | Thielen et al. | Apr. 23, 1895 |
| 836,737 | Connely | Nov. 27, 1906 |
| 1,034,843 | Sizer | Aug. 6, 1912 |
| 1,051,754 | Olson | Jan. 28, 1913 |
| 1,118,570 | Nedergard | Nov. 24, 1914 |
| 1,295,386 | Thompson | Feb. 25, 1919 |
| 1,787,313 | Houts | Dec. 30, 1930 |
| 1,837,524 | Braden | Dec. 22, 1931 |
| 2,160,437 | Martin | May 30, 1939 |
| 2,422,367 | Quigley | June 17, 1947 |
| 2,500,800 | Carlson | Mar. 14, 1950 |